United States Patent
Le et al.

(10) Patent No.: US 8,296,520 B2
(45) Date of Patent: Oct. 23, 2012

(54) SYSTEM AND METHOD FOR OPTIMIZING NEIGHBORING CACHE USAGE IN A MULTIPROCESSOR ENVIRONMENT

(75) Inventors: Hien Minh Le, Cedar Park, TX (US); Jason Alan Cox, Raleigh, NC (US); Robert John Dorsey, Durham, NC (US); Richard Nicholas, Round Rock, TX (US); Eric Francis Robinson, Raleigh, NC (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 11/959,652

(22) Filed: Dec. 19, 2007

(65) Prior Publication Data

US 2009/0164731 A1 Jun. 25, 2009

(51) Int. Cl.
*G06F 12/08* (2006.01)

(52) U.S. Cl. ......... 711/124; 711/121; 711/135; 711/143

(58) Field of Classification Search .......................... None
See application file for complete search history.

(56) References Cited

U.S. PATENT DOCUMENTS

| | | | |
|---|---|---|---|
| 6,353,875 B1 * | 3/2002 | Arimilli et al. | ............... 711/143 |
| 6,385,695 B1 | 5/2002 | Arimilli et al. | |
| 6,460,114 B1 | 10/2002 | Jeddeloh | |
| 6,970,976 B1 | 11/2005 | Arimilli et al. | |
| 7,076,609 B2 | 7/2006 | Garg et al. | |
| 7,464,227 B2 * | 12/2008 | Edirisooriya et al. | ........ 711/144 |
| 7,689,771 B2 * | 3/2010 | Fields et al. | ................... 711/122 |
| 2006/0123206 A1 | 6/2006 | Barrett et al. | |

(Continued)

OTHER PUBLICATIONS

Speight, Evan et al., Adaptive Mechanisms and Policies for Managing Cache Hierarchies in Chip Multiprocessors, International Conference on Computer Architecture; Proceedings of the 32nd Annual International Symposium on Computer Architecture, 2005, pp. 346-356.

(Continued)

*Primary Examiner* — Gary Portka
(74) *Attorney, Agent, or Firm* — Patrick E. Caldwell, Esq.; The Caldwell Firm, LLC

(57) ABSTRACT

A method for managing data operates in a data processing system with a system memory and a plurality of processing units (PUs), each PU having a cache comprising a plurality of cache lines, each cache line having one of a plurality of coherency states, and each PU coupled to at least another one of the plurality of PUs. A first PU selects a castout cache line of a plurality of cache lines in a first cache of the first PU to be castout of the first cache. The first PU sends a request to a second PU, wherein the second PU is a neighboring PU of the first PU, and the request comprises a first address and first coherency state of the selected castout cache line. The second PU determines whether the first address matches an address of any cache line in the second PU. The second PU sends a response to the first PU based on a coherency state of each of a plurality of cache lines in the second cache and whether there is an address hit. The first PU determines whether to transmit the castout cache line to the second PU based on the response. And, in the event the first PU determines to transmit the castout cache line to the second PU, the first PU transmits the castout cache line to the second PU.

20 Claims, 5 Drawing Sheets

U.S. PATENT DOCUMENTS

| | | | |
|---|---|---|---|
| 2006/0179235 | A1 | 8/2006 | Bell, Jr. et al. |
| 2006/0184742 | A1 | 8/2006 | Clark et al. |
| 2006/0184743 | A1 | 8/2006 | Guthrie et al. |
| 2006/0230252 | A1 | 10/2006 | Dombrowski et al. |
| 2006/0236037 | A1 | 10/2006 | Guthrie et al. |
| 2006/0282587 | A1* | 12/2006 | Srinivasan ............ 710/240 |
| 2008/0320226 | A1* | 12/2008 | Blake et al. ........... 711/133 |

OTHER PUBLICATIONS

Zhang, Michael et al., Victim Replication: Maximizing Capacity while Hiding Wire Delay in Tiled Chip Multiprocessors, International Conference on Computer Architecture; Proceedings of the 32nd Annual International Symposium on Computer Architecture, 2005, pp. 336-345.

Memik, Gokhan et al., Reducing energy and delay using efficient victim caches, International Symposium on Low Power Electronics and Design; Proceedings of the 2003 international symposium on Low power electronics and design; Seoul, Korea; Session: Power efficient cache design, 2003, pp. 262-265.

Allu, Bramha et al., Exploiting the replication cache to improve performance for multiple-issue microprocessors, ACM SIGARCH Computer Architecture News archive; vol. 33 , Issue 3 Special issue: MEDEA 2004 workshop; Column: Regular contributions, 2005, pp. 63-71.

Naz, Afrin et al., Making a case for split data caches for embedded applications, Memory Performance: Dealing With Applications, Systems and Architecture; Proceedings of the 2005 workshop on Memory performance: Dealing with Applications , systems and architecture; Saint Louis, Missouri; Special Issue: MEDEA'05, 2006, pp. 19-26.

Dybdahl, Haakon et al., An LRU-based replacement algorithm augmented with frequency of access in shared chip-multiprocessor caches, Memory Performance: Dealing With Applications, Systems and Architecture, Proceedings of the 2005 workshop on Memory performance: Dealing with Applications, 2006, pp. 45-52.

Temam, Olivier, Investigating optimal local memory performance, Architectural Support for Programming Languages and Operating Systems; Proceedings of the eighth international conference on Architectural support for programming languages and operating systems; San Jose, California, United States, 1998, pp. 218-227.

* cited by examiner

SYSTEM AND METHOD FOR OPTIMIZING NEIGHBORING CACHE USAGE IN A MULTIPROCESSOR ENVIRONMENT

TECHNICAL FIELD

The present invention relates generally to the field of computer networking and parallel processing and, more particularly, to a system and method for optimizing neighboring cache usage in a multiprocessor environment.

BACKGROUND OF THE INVENTION

Modern electronic devices often include multiple processors, each sometimes referred to as a processing unit (PU), that each include core logic (a "core"), a level one (L1) cache, and a level 2 (L2) cache. Typically, each core can access only its own dedicated L2 cache, and cannot normally access the L2 cache of a nearby PU.

One skilled in the art will understand that there are many scenarios in which a core does not use its dedicated L2 cache to the maximum extent possible. For example, this may occur when a core executes code that uses the L2 cache only slightly or code from locked cache ways, when a core is powered down or in sleep mode, or when a core has been disabled, as, for example, in response to a detected manufacturing defect. These examples are but a sample of the many common scenarios in which a core underutilizes its dedicated L2 cache.

In light of this underutilization, there have been several attempts to improve cache performance, including some systems wherein one or more PUs share certain levels of their caches with each other. Each of the current approaches suffers from one or more disadvantages. Generally, one set of solutions focuses on castout handling, wherein the PU selects a cache line to "cast out" of its cache, ordinarily in order to make room for an incoming cache block that will be stored in the cache location currently occupied by the cache line selected for castout.

For example, one simple solution is to evict or "cast out" all cache lines to memory. That is, the simplest solution is to write back castout cache lines to memory when they are cast out. The castout lines can subsequently be retrieved over a common coherent bus, to which all L2 caches (and their associated PUs) are attached. However, this approach suffers from the obvious drawback that casting out all lines all the way to memory is inefficient and hinders performance. Further, this method does not enable one core to share another core's cache when that cache is underutilized. Additionally, this approach does not allow a cache to be employed when its core is powered down in sleep mode or has been deactivated because of a core manufacturing defect.

Another conventional approach provides a dedicated victim cache for each L2 cache. In this approach, evicted lines are cast out to the victim cache, and the victim cache is typically configured to hold only cache lines evicted from the L2 cache on a cache miss. This approach, however, adds an extra cache and supporting hardware, which consumes a greater area and power than the L2 cache by itself. Additionally, typical victim caches ordinarily allot space for only one or two lines per congruence class, compared to the six to eight lines in a standard cache, which therefore provides only a limited solution.

In another approach, hereinafter referred to as the Former approach, the PUs couple to a common L3 cache, and the L3 cache preselects one of three neighboring L2 caches to serve as a makeshift victim cache. Once the L3 cache selects the victim cache, the L3 cache and victim cache perform a request/grant handshake via a private communication, followed by a data-only transfer on a bus coupling the L3 and L2 caches.

The Former approach suffers from the disadvantage that it lacks a mechanism to track whether a cache line has been previously moved. As such, evicted lines in the Former system can circulate from cache to cache indefinitely, which can cause unnecessary bandwidth costs and hamper system performance. Further, the Former victim cache, the castout target cache, must accept the incoming cache line, which can require the victim cache to evict a cache line that it otherwise would have kept in the cache. As such, the Former approach can enhance the performance of one cache at the expense of another.

In another approach, hereinafter referred to as the Garg approach, illustrated by U.S. Pat. No. 7,076,609, the cores share two L2 caches, splitting the associativity across the L2 caches equally. The PUs share combined replacement controls, such as, for example, for L2 miss detection and handling. Specifically, the Garg approach allocates a new line, retrieved from memory in response to an L2 cache miss, into either of the L2s, depending on the replacement policy at that time. Further, the Garg approach searches both L2 caches simultaneously in response to an L1 miss.

As such, the Garg approach provides a shared, multi-bank level 2 cache, with a wide associativity. The Garg approach therefore also suffers from the disadvantages of a single shared cache. Specifically, Garg line replacement methods must search multiple L2 caches, which increases search time. Further, because the associativity in Garg extends across L2 caches, each Garg L2 cache must be searched whenever any one L2 cache must be searched, not only in the event of a local L2 cache miss. Additionally, because no Garg cache contains all the associativity for a particular congruence class, a cache replacement placed in one L2 cache will still miss in a local L2 not containing the cache line, which would ordinarily hit in a conventional system.

Therefore, there is a need for a system and/or method for optimizing neighboring cache usage in a multiprocessor environment that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved method for optimizing cache usage.

It is a further aspect of the present invention to provide for an improved system for optimizing cache usage.

It is a further aspect of the present invention to provide for an improved system for optimizing neighboring cache usage in a multiprocessor environment.

It is a further aspect of the present invention to provide for an improved method for optimizing neighboring cache usage in a multiprocessor environment.

It is a further aspect of the present invention to provide for a method for allocating data in a data processing system.

It is a further aspect of the present invention to provide for a method and system for communication between neighboring caches for cache management.

The aforementioned aspects and other objectives and advantages can now be achieved as described herein. A method for managing data operates in a data processing system with a system memory and a plurality of processing units (PUs), each PU having a cache comprising a plurality of cache lines, each cache line having one of a plurality of coherency states, and each PU coupled to at least another one of the plurality of PUs. A first PU selects a castout cache line of a plurality of cache lines in a first cache of the first PU to be castout of the first cache. The first PU sends a request to a second PU, wherein the second PU is a neighboring PU of the first PU, and the request comprises a first address and first coherency state of the selected castout cache line. The second PU determines whether the first address matches an address of any cache line in the second PU. The second PU sends a response to the first PU based on a coherency state of each of a plurality of cache lines in the second cache and whether there is an address hit. The first PU determines whether to transmit the castout cache line to the second PU based on the response. And, in the event the first PU determines to transmit the castout cache line to the second PU, the first PU transmits the castout cache line to the second PU.

In an alternate embodiment, a system comprises a system memory and a plurality of processing units (PUs) coupled to the system memory. Each PU comprises a cache and couples to at least one other of the plurality of PUs. A first PU selects a castout cache line of a plurality of cache lines in a first cache of the first PU to be castout of the first cache. The first PU sends a request to a second PU, wherein the second PU is a neighboring PU of the first PU, and the request comprises a first address and first coherency state of the selected castout cache line. The second PU couples to the first PU and determines whether the first address matches an address of any cache line in the second PU. The second PU sends a response to the first PU, based on a coherency state of each of a plurality of cache lines in the second cache and whether there is an address hit. The first PU determines whether to transmit the castout cache line to the second PU based on the response. And, in the event the first PU determines to transmit the castout cache line to the second PU, the first PU transmits the castout cache line to the second PU.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
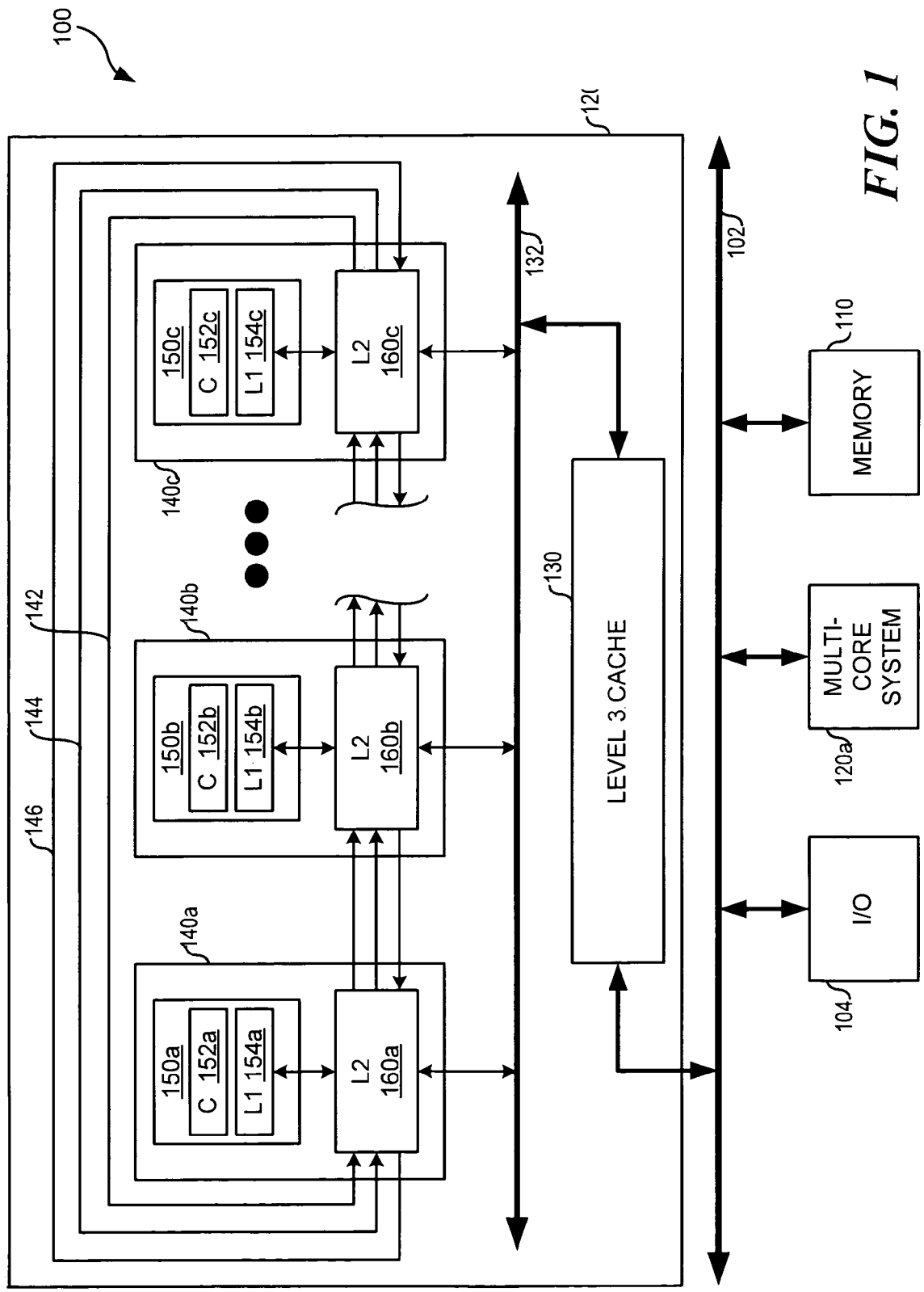
FIG. 1 illustrates a block diagram depicting a computer system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved cache coherency, in accordance with a preferred embodiment of the present invention. System 100 comprises a system bus 102.

Generally, system bus 102 is an otherwise conventional computer system bus, modified as described below, to which the various components of system 100 couple. More specifically, computer system 100 includes an input/output (I/O) system 104. I/O system 104 couples to system bus 102 and is an otherwise conventional I/O system, including software and hardware to provide an interface between system 100 and, for example, a user, another computer system, the Internet, or other suitable external entity. Generally, I/O 104 is the collection of common components and software that make up an input/output system for a modern computer system, not otherwise described herein, as one skilled in the art will understand.

System 100 also includes memory 110. Memory 110 couples to system bus 102 and is an otherwise conventional computer system memory. System 100 also includes one or more multi-core systems (MCS) 120. Generally, as described in more detail below, each MCS 120 is a processor or plurality of processors, including caches and other support hardware, configured to perform typical computer tasks, in accordance with one or more preferred embodiments described herein. In the illustrated embodiment, system 100 includes two MCSs, MCS 120 and MCS 120a. In an alternate embodiment, one MSC 120 can be replaced with a conventional processing unit (PU). One skilled in the art will understand that system 100 can also be configured with more than two MCSs 120, one or more of which can be replaced with a conventional PU. In the illustrated embodiment, MCS 120a represents these various options collectively. Generally, MCS 120 and MCS 120a receive and process data for system 100.

Generally, in the illustrated embodiment, MCS 120 couples to the other components of system 100 through a level 3 (L3) cache 130 coupled to system bus 102. L3 cache 130 is an otherwise conventional L3 cache, modified as described herein, and contains instructions and/or data for processing units (PUs) of MCS 120. L3 cache 130 also couples to a secondary bus 132. Secondary bus 132 is contained entirely within MCS 120, and is an otherwise conventional computer system bus.

MCS 120 includes a plurality of processing units (PUs) 140 that couple to one or more other PUs and to secondary bus 132. In the illustrated embodiment, MCS 120 includes three exemplary PUs 140, PU 140a, PU 140b, and PU 140c, each of which couple to secondary bus 132. Generally, each PU 140 is configured to communicate with L3 cache 130 through secondary bus 132. Further, each PU 140 generally receives data and instructions for processing, processes the received data and instructions, and returns results to one or more other components of system 100.

Each PU 140 couples to one or more other PUs through a plurality of communication channels. FIG. 1 illustrates three such communication channels in an exemplary embodiment. Specifically, each PU 140 in system 100 couples to a downstream PU through an interconnect link 142 and link 144. Similarly, each PU 140 in system 100 couples to an upstream PU through an interconnect link 146. As used herein, "each" means all of a particular subset. Links 142, 144, and 146 are otherwise conventional communication channels, interconnects, or other connection suitable to couple the PUs to each other for data/instruction transfer, control communications, or other suitable operations.

In one embodiment, link 142 is a downstream request link and is configured to transmit a cast-in request from one PU to a downstream neighboring PU. In one embodiment, line 144 is a downstream data link and is configured to transmit cache line information such as address and state from one PU to a downstream neighboring PU. In one embodiment, link 146 is an upstream hint line and is configured to indicate from a downstream PU to an upstream neighboring PU whether the downstream PU is available to receive incoming cast-in cache lines, as described in more detail below.

As used herein, the terms "upstream" and "downstream" refer to the PUs in relation to each other, whether organized into a ring, star, or other topology. That is, a target PU receives cast-in cache lines, described in more detail below, from an "upstream" neighboring PU. Similarly, a PU casts out cache lines to a neighboring "downstream" PU. As used herein, a "neighboring PU" is a PU coupled to another PU so as to exchange control information, data, and instructions with the other PU.

Each PU 140 includes a core 150, shown as 150a, 150b, and 150c. Each core 150 includes core logic 152, shown as 152a, 152b, and 152c. Core logic 152 is an otherwise conventional core logic, modified as described herein. Each core logic 152 couples to a dedicated level 1 (L1) cache 154, shown as 154a, 154b, and 154c. L1 cache 154 is an otherwise conventional L1 cache, modified as described herein.

Each core 150 couples to a dedicated level 2 (L2) cache 160, shown as 160a, 160b, and 160c. L2 cache 160 is an otherwise conventional L2 cache, modified as described herein. As described in more detail below, each PU 140 is configured to initiate a cast out of certain cache lines, under certain circumstances, from its own L2 cache 160 to a neighboring PU's L2 cache 160.

For example, in one embodiment, PU 140a casts out a cache line from its L2 cache 160a to downstream PU 140b's L2 cache 160b. L2 cache 160b receives the cache line as a "cast-in" cache line. Similarly, in one embodiment, PU 140c casts out a cache line from its L2 cache 160c to downstream PU 140a's L2 cache 160a. L2 cache 160a receives the cache line as a "cast-in" cache line. Thus, the PUs 140 of MCS 120 are generally configured to cast out cache lines to a neighboring PU's L2 cache, under certain circumstances described in more detail below.

Additionally, exemplary system 100 illustrates the features of the cast-out/cast-in operations described herein with respect to L2-to-L2 transactions. One skilled in the art will understand that the principles of the embodiments disclosed herein can also be applied to operate in L3-to-L3 transactions, L1-to-L1 transactions, and other suitable configurations, with the benefit of the teachings herein. One skilled in the art will also appreciate the need for some mechanism to maintain coherency among the various levels of the cache hierarchy.

While there are a number of modern protocols and techniques for achieving cache coherence, most typical protocols allow only one processor permission to write to a given memory location, as a cache block, at any particular point in time. As such, whenever a PU wishes to write to a memory location, there must be some mechanism to verify with all of the other PUs that the pending write operation is acceptable under the coherency protocol. In one embodiment, the PUs attempt this verification through a "snoop" protocol.

As described above, in one embodiment, the PUs in a multi-core system couple together over a secondary bus (for example, secondary bus 132 of FIG. 1). The PUs communicate over the secondary bus for coherency and other purposes, including, for example, indicating a desire to read from or write to memory locations. When a PU indicates a pending operation on the secondary bus, all the other PUs monitor (or "snoop") the pending operation. The snooping PUs compare the target memory location in the pending operation to the stored memory locations in their respective caches, determining whether the cache states can allow the pending operation and, if so, under what conditions.

In typical modern protocols, and in embodiments of the present invention herein, there are several bus memory transactions that require snooping and follow-up action, as one skilled in the art will understand. A "read with intent to write" for example, requires snooping and follow-up action. Additionally, in some embodiments, there are additional hardware and signaling lines required to support the snoop operations, which are omitted here for clarity.

Thus, generally, in order to maintain cache coherence, whenever a PU wishes to read or write a memory block, it must indicate that desire to the other PUs in the system. The cache coherence protocol therefore includes a status indicator indicating the current coherency "state" of the block, with each cache block in each level having its own state. For example, if only one PU has an active copy of a cache block, that PU marks the block as being in a coherency state of "exclusive," subject to additional protocol requirements described in more detail below. Generally, PUs can write to an exclusive cache block without first communicating with other PUs in the system because no other processing unit has a copy of that cache block.

Additionally, in some instances, PUs can retrieve requested cache blocks directly from neighboring PUs, instead of from main memory, in an "intervention" operation. As such, the source PU can transfer the requested cache block to the requesting PU without causing coherency problems, and without first writing the cache block to memory.

Generally, as used herein, a "coherency state" refers to one of a plurality of states representing the relationship between data stored in a cache and data stored in memory and in other caches. To reduce confusion, the discussion herein refers to cache lines or cache blocks as being "in a coherency state of X" or "in coherency state X," where X indicates a coherency state associated with the cache line/block. This serves to distinguish an invalid coherency state (a coherency state not defined by the coherency protocol), from an invalid cache line (a cache line with invalid data). For example, a "coherency state of Shared(moved)" is an invalid coherency state in the coherency protocol described herein, whereas a "coherency state of invalid" is a valid coherency state.

Figure 2:
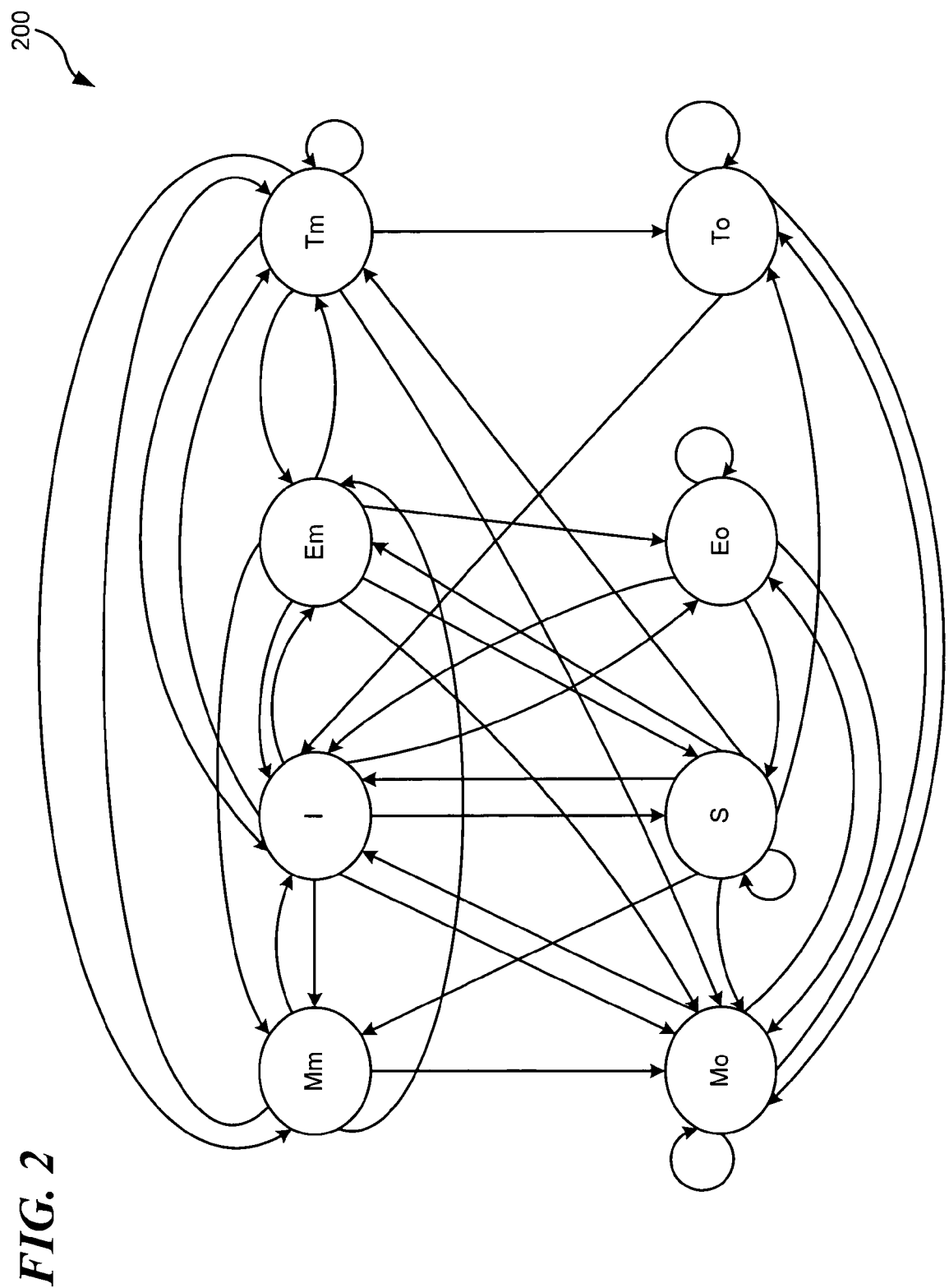
FIG. 2 illustrates a high-level state diagram depicting logical states of an improved cache coherency protocol, which can be implemented in accordance with a preferred embodiment.

FIG. 2 illustrates one embodiment of a plurality of valid coherency states in an improved cache coherency protocol. Specifically, FIG. 2 illustrates a high-level state diagram 200 depicting logical states of an improved cache coherency protocol, which can be implemented in accordance with a preferred embodiment.

Diagram 200 illustrates eight valid coherency states: Modified(moved) ("Mm"), Modified(owned) ("Mo"), Invalid ("I"), Shared ("S"), Exclusive(moved) ("Em"), Exclusive(owned) ("Eo"), Tagged(moved) ("Tm"), and Tagged(owned) ("To"). Generally, states Mm, Mo, I, S, Em, and Eo are configured as the well-known MESI protocol states "Moved," "Exclusive," "Shared," and "Invalid," except as modified herein.

Generally, state Mo indicates that the cache line is valid and contains modified data. Copies of this line do not and cannot exist in any other cache. The local PU has accessed this cache line. The local PU is the PU that includes the cache storing this cache line.

Generally, state Mm indicates that the cache line is valid and contains modified data. Copies of this line do not and cannot exist in any other cache. The local PU has not accessed this cache line. Further, this cache line was received by the local PU as a cast-in cache line, from a neighboring PU that cast out the cache line.

Generally, state Eo indicates that the cache line is valid and contains unmodified data, that is, the data matches data stored in memory. Copies of this line do not and cannot exist in any other cache. The local PU has accessed this cache line.

Generally, state Em indicates that the cache line is valid and contains unmodified data. Copies of this line do not and cannot exist in any other cache. The local PU has not accessed this cache line. Further, this cache line was received by the local PU as a cast-in cache line, from a neighboring PU that cast out the cache line.

Generally, state S indicates that the cache line is valid and copies of this line may exist in other caches. In the illustrated embodiment, state S indicates only that the cache line is valid and that other copies may exist. In an alternate embodiment, state S includes a sub-state, Shared(last) ("S(l)") indicating that the cache line is the most-recently accessed of the copies of the cache line. The S(l) state facilitates data intervention of lines in the "shared" state.

Generally, state I indicates that the cache line is not valid in the current cache. Copies of the cache line may exist in other caches, in various other states.

Generally, state To indicates that the cache line is valid and contains modified data. A PU has sent at least one copy of this cache line to another PU's cache though an intervention operation. The local PU has accessed this cache line. One skilled in the art will recognize that state To is an extension to the well-known MESI cache coherency protocol. Generally, a "tagged" state indicates that the PU holding the tagged cache line is responsible for writing the modified cache line back to the memory hierarchy at some time in the future. The PU holding the tagged cache line can satisfy its responsibility by writing back to system memory or by passing the tag to another PU.

Generally, state Tm indicates that the cache line is valid and contains modified data. A PU has sent at least one copy of this cache line to another PU's cache though an intervention operation. Further, this cache line was received by the local PU as a cast-in cache line, from a neighboring PU that cast out the cache line. The local PU has not accessed this cache line.

Companion application, filed concurrently herewith, describes in additional detail the unique coherency protocols that can be configured to operate in conjunction with embodiments disclosed herein. Companion application, filed concurrently herewith, described in additional detail a unique cache line replacement selection protocol that can be configured to operate in conjunction with embodiments disclosed herein.

Figure 3:
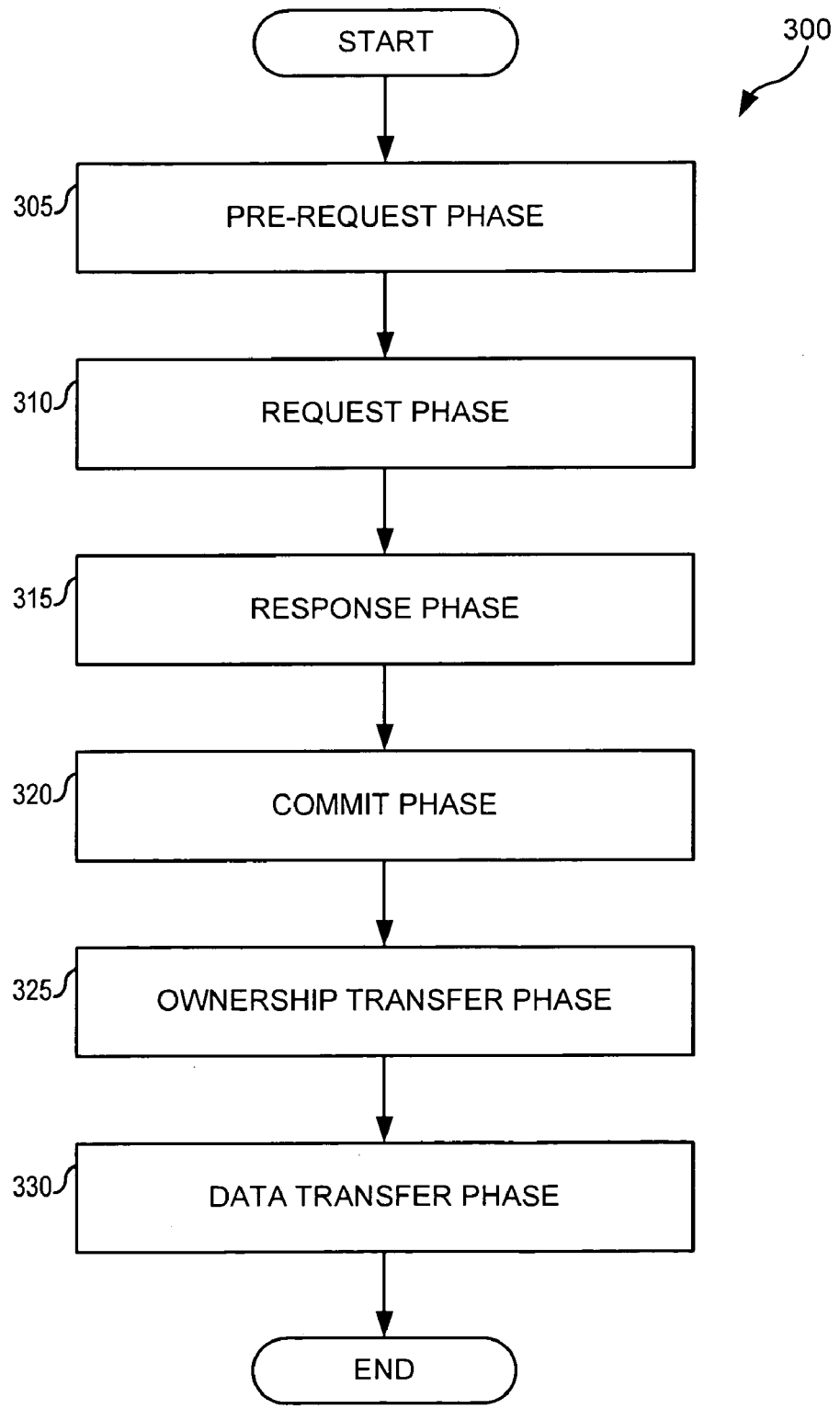
FIG. 3 illustrates a high-level flow diagram depicting logical operational steps of an improved method for optimizing neighboring cache usage in a multiprocessor system, which can be implemented in accordance with a preferred embodiment.

FIG. 3 illustrates one embodiment of a method for optimizing neighboring cache usage in a multiprocessor system. Specifically, FIG. 3 illustrates a high-level flow chart 300 that depicts logical operational steps performed by, for example, system 100 of FIG. 1 implementing coherency protocol 200 of FIG. 2, which may be implemented in accordance with a preferred embodiment. Generally, MCS 120, and in particular neighboring PUs 140, performs the steps of the method, unless indicated otherwise.

As illustrated at block 305, the process begins, in a pre-request phase. During the pre-request phase, from the perspective of any one PU, the PU operates otherwise conventionally, except as described below.

For example, independent of the pre-request phase, in the case of a read miss in the PU's L2 cache, the PU does not request cache lines from neighboring PUs to satisfy its own read misses. Instead, the requesting PU initiates a read request on a system bus, such as, for example, secondary bus 132 of FIG. 1. If another PU has the requested cache line in its L2 cache, that PU provides the requested cache line to the requesting PU through an intervention operation.

During the pre-request phase, the PU indicates its receptivity to receive cast-in cache lines from upstream neighboring PUs. In one embodiment, the PU indicates its receptivity by raising to logic high a hint line, such as, for example, hint line 146 of FIG. 1, whenever the PU is receptive to receive cast-in cache lines from upstream neighboring PUs. In one embodiment, a PU is receptive to receive cast-in cache lines when there are empty or invalid cache lines in the PU's L2 cache, and is not receptive otherwise. In an alternate embodiment, a PU is receptive to receive cast-in cache lines according to a pre-determined algorithm based on the number of available cache lines in the PU's L2 cache. In an alternate embodiment, a PU is receptive to receive cache lines whenever it is not operating in a mode likely to require extensive use of its own cache, as determined by a pre-determined algorithm. In an alternate embodiment, a PU is receptive to receive cache lines whenever there are available cache lines in the PU's L2 cache in coherency states invalid, shared, or moved, and is otherwise not receptive.

During the pre-request phase, the PU also monitors the receptivity of downstream neighboring PUs to receive cast-in cache lines from the PU. In one embodiment, the PU periodically samples a hint line associated with a downstream neighboring PU. In an alternate embodiment, the downstream neighboring PU's hint lines couple to the PU so as to continuously indicate their availability to receive cast-in cache lines from the PU. In an alternate embodiment, the PU samples the hint lines of its downstream neighboring PUs at designated decision points, described in more detail below.

In the illustrated embodiment, each PU operates in the pre-request phase whenever that PU is not performing a cache line replacement selection operation. In an alternate embodiment, each PU enters the pre-request phase in response to a determination by that PU that it must evict a line from its L2 cache. In an alternate embodiment, the pre-request phase includes speculative cast-out assessment. In one embodiment, for example, in the event of a load miss, the local PU initiates the cast-in request speculatively, before selecting the local victim cache location. As such, the PU assume a cast out is necessary, cancelling the cast out in the event the selected local victim cache location is in the coherency state of shared, invalid, or moved. In an alternate embodiment, the PU initiates a speculative cast-in request before the PU knows whether a cache operation is a hit or a miss.

Next, as illustrated at block 310, the request phase begins. During the request phase, which occurs subsequent to a PU's determination that is must evict a line from its L2 cache, the PU determines which cache line to evict. The PU selects a cache line for eviction, and that cache line becomes a cast-in candidate for downstream neighboring PUs. From the perspective of the evicting PU, the selected cache line is a cast out cache line.

During the request phase the evicting (upstream) PU queries one or more downstream neighboring PUs with a cast-in request. In one embodiment, the evicting PU transmits a discrete cast-in request to each downstream neighboring PU. In an alternate embodiment, the evicting PU raises a cast-in request signal indicating that the evicting PU has placed a cast-in request on a bus, such as, for example, through request link 142 and data link 144 of FIG. 1. In one embodiment, the cast-in request includes the selected cache line address and coherency state. In one embodiment, the evicting PU only sends cast-in requests to those downstream neighboring PUs that have indicated they are receptive to receiving cast-in cache lines.

During the request phase, PUs that have received cast-in requests examine their L2 caches to determine whether the receiving PU (that is, the downstream neighboring PU) already has a copy of the cast-in candidate, and if so, the coherency state of the copy. The PUs use the results of this examination during the response phase.

Next, as illustrated at block 315, the response phase begins. During the response phase, each receiving PU formulates a cast-in response to its received cast-in request, and sends the cast-in response to the requesting PU. In one embodiment, a receiving PU formulates a cast-in response based on the status of the receiving PU's L2 cache and the coherency state of the cast-in candidate. In one embodiment, the status of the receiving PU's L2 cache includes the results of the examination performed during the response phase. In one embodiment, the status of the receiving PU's L2 cache is based on one or more of configuration bits of the receiving PU's L2 cache, directory hit/miss indications, the receiving PU's L2 cache coherency state, and/or other suitable bases.

In one embodiment, the receiving PU sends the cast-in response through a dedicated response link. In an alternate embodiment, the receiving PU rejects the cast-in request by setting its hint line to logic low, indicating that it is no longer receptive. In an alternate embodiment, the receiving PU sends a discrete cast-in response to the requesting PU.

In one embodiment, the cast-in response indicates one of four responses: "no", "retry", "OK and need data", or "OK and do not need data". Generally, a "no" response rejects the cast-in request. In one embodiment, a "no" response also indicates that the requesting PU should not retry the cast-in request. Generally, a "retry" response rejects the cast-in request, and suggests that the receiving PU may be able to receive the cast-in cache line within a pre-determined subsequent time window.

Generally, an "OK and need data" response accepts the cast-in request and indicates to the requesting PU that the receiving PU does not already have the cache line data, as described in more detail below. Generally, an "OK and do not need data" response accepts the cast-in request and indicates to the requesting PU that the receiving PU already has the cache line data, as described in more detail below.

In one embodiment, the cast-in response includes a route tag indicating the cache location in the receiving PU's L2 cache where the receiving PU has determined to place the incoming cast-in cache line. In an alternate embodiment, the cast-in response does not include a route tag.

Next, as illustrated at block 320, the commit phase begins. During the commit phase, the requesting PU receives one or more cast-in responses from the PUs to which the requesting PU sent requests, and determines whether to cast out the selected cache line. In one embodiment, the requesting PU determines whether a cast out is still required. In one embodiment, if a cast out is still required, the requesting PU determines whether to cast out the selected cache line to memory (or a lower level in the cache hierarchy) or to one of the accepting downstream neighboring PUs, if any. In one embodiment, if the requesting PU determines to cast out the selected cache line to one of the accepting downstream neighboring PUs, the requesting PU selects one of the accepting downstream neighboring PUs to receive the cast out cache line.

During the commit phase, in one embodiment, the requesting PU sends a commit signal to each downstream neighboring PU that sent a cast-in response to the requesting PU. In an alternate embodiment, the requesting PU sends a commit signal to each downstream neighboring PU to which the requesting PU sent a cast-in request. In one embodiment, the commit signal indicates one of two responses: "Go" or "No Go". Generally, "Go" indicates to the receiving PU that the requesting PU has confirmed the cast-in request and that the requesting PU will initiate a state change and/or data transfer. Generally, "No Go" indicates to the receiving PU that it should ignore the previous cast-in request. Generally, the requesting PU sends a Go commit signal to only one of the accepting downstream neighboring PUs, and sends a No Go to the remaining accepting downstream neighboring PUs. In one embodiment, the commit signal also includes a route tag, if the requesting PU received a route tag from the selected receiving PU.

Next, as illustrated at block 325, the ownership transfer phase begins. Generally, during the ownership transfer phase, the requesting PU relinquishes ownership of the cast out cache line, and the selected receiving PU assumes ownership of the cast-in cache line. In one embodiment, the receiving PU assumes ownership of the cast-in cache line when the receiving PU receives a Go commit signal from the requesting PU.

In one embodiment, the requesting PU protects the cast out cache line until the receiving PU indicates that the receiving PU has assumed ownership of the cast out (the receiving PU's cast-in) cache line. In one embodiment, the receiving PU sends a confirmation signal to the requesting PU, indicating that the PU has assumed ownership of the cast-in cache line. One skilled in the art will understand that the requesting PU can omit this phase in instances where the requesting PU has determined that cast out is no longer required.

In one embodiment, the receiving PU indicates ownership of the cast-in cache line through a broadcast signal on a system bus, such as, for example, secondary bus 132 of FIG. 1. In an alternate embodiment, the receiving PU indicates ownership of the cast-in cache line through modifying a directory entry corresponding to the cache line in the PU's L2 cache. Generally, in one embodiment, ownership of a cache line indicates responsibility for the coherency of the cache line. In one embodiment, responsibility for the coherency of the cache line includes issuing the proper responses on the bus in response to snoops and/or writing modified data back to memory or intervening data to other caches. One skilled in the art will understand that, generally, cache coherency principles require that, as a line is passed from one cache to another, there is never an observable gap in protection of the cache line from the perspective of coherency requests or snoops.

In an alternate embodiment the requesting PU protects the cache line only until it has placed all of the castout data onto the bus. Subsequently, all of the receiving PUs that indicate that they are able to take ownership of line begin to protect the line from the time of the response phase until the commit phase. At commit time, the receiving PUs, except the selected receiving PU (in one embodiment, the receiving PU that receives a "Go" indication), stop protecting the line. One advantage of this embodiment is that there does not need to be a handshake back to the sending PU that the selected receiving PU has assumed ownership of the cache line. An additional benefit is that the sending PU can free its sending resource as soon as it has sent its castout data without having to wait for the latency of the handshake.

Next, as illustrated at block 330, the data transfer phase begins. Generally, during the data transfer phase, the requesting PU transmits the cast out cache line data to the receiving PU, if necessary. In one embodiment, the requesting PU puts the cache line data on a system bus, such as, for example, secondary bus 132 of FIG. 1, and the receiving PU retrieves the cache line data from the system bus. When the data transfer is complete, the process ends.

Figure 4:
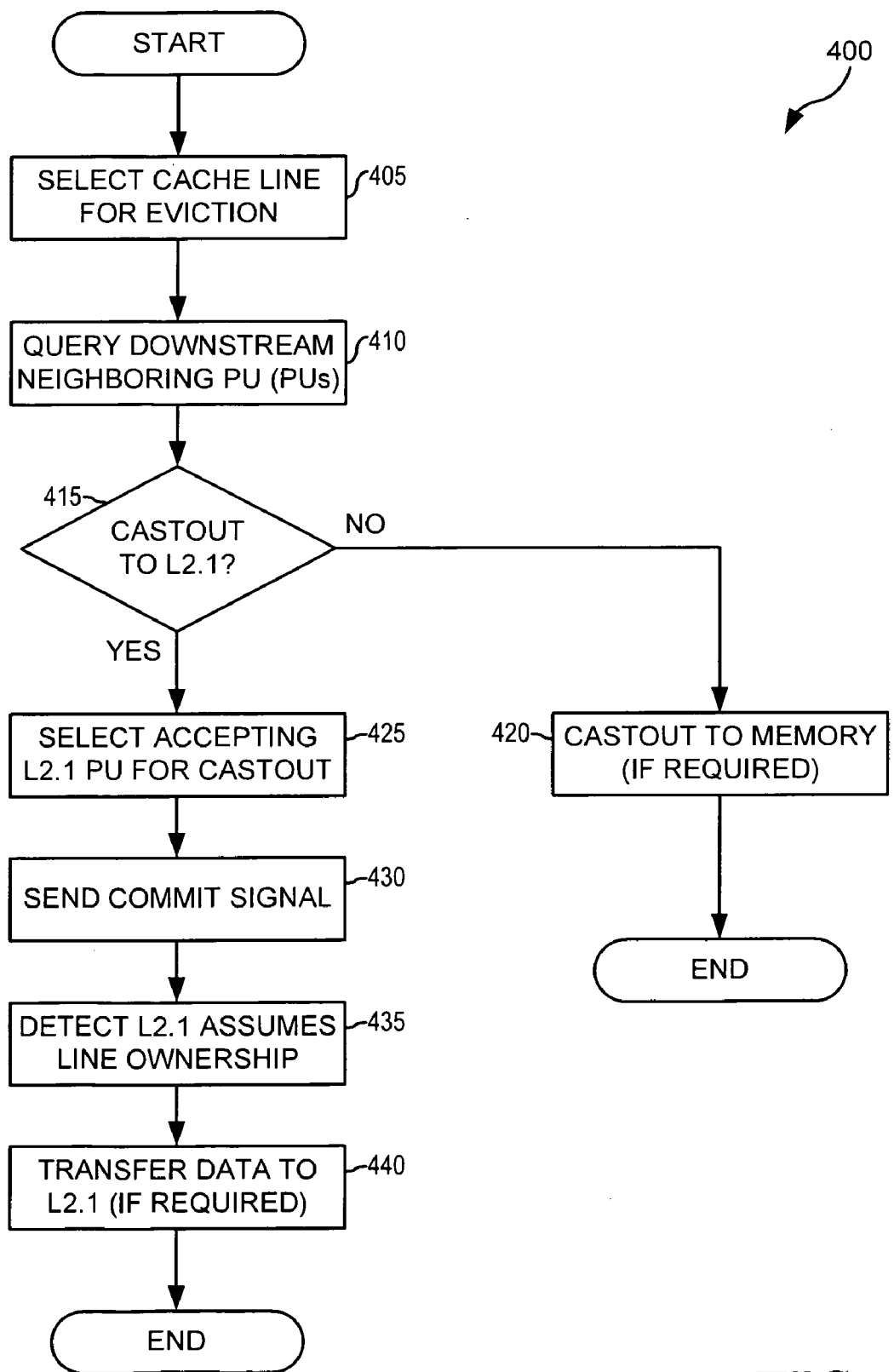
FIG. 4 illustrates a high-level flow diagram depicting logical operational steps of an improved method for optimizing neighboring cache usage in a multiprocessor system, which can be implemented in accordance with a preferred embodiment.

FIG. 4 illustrates one embodiment of a method for optimizing neighboring cache usage in a multiprocessor system. Specifically, FIG. 4 illustrates a high-level flow chart 400 that depicts logical operational steps performed by, for example, system 100 of FIG. 1 implementing coherency protocol 200 of FIG. 2, which may be implemented in accordance with a preferred embodiment. Generally, MCS 120, and in particular a PU 140, performs the steps of the method, unless indicated otherwise.

In particular, the process begins when a PU determines that it must evict a cache line. As illustrated at block 405, the PU selects a cache line for eviction. As described above, the PU can select a cache line for eviction in accordance with a cache line replacement selection protocol such as, for example, the novel cache line replacement selection protocol described in co-pending application, filed concurrently herewith.

Next, as illustrated at block 410, the PU queries one or more downstream neighboring PUs with a cast-in request to determine whether any of the downstream neighboring PUs accepts the cast-in request. In one embodiment, the PU also samples each downstream neighboring PU's hint line. In one embodiment, the PU sends a cast-in request only to those neighboring PUs whose hint line indicates that they are receptive to receiving cast-in cache lines. As described above, the cast-in request includes an address and coherency state for the cache line selected for eviction.

In some instances, the discussion herein refers to the PU's own L2 cache as an "L2.0" cache, and a downstream neighboring PU's cache as an "L2.1" cache. One skilled in the art will understand that the designations L2.0 and L2.1 are relative and that the same PU's L2 cache is an L2.0 to itself and its downstream neighboring PUs, and is an L2.1 cache to upstream neighboring PUs.

Next, as illustrated at decisional block 415, the PU determines whether to cast out the selected cache line to an accepting PU's L2.1 cache. As described above, the PU can decide not to evict the selected cache line for a variety of reasons, including that the PU no longer needs to evict a cache line from its L2.0 cache. Another reason would be based on a hint from the pre-request phase indicating that none of the neighboring PUs are willing to accept the cast-in. Another reason would be based on the state of the cache line, which is, if the cache line is in a moved state (and therefore has already been moved at least once), the coherency protocol can restrict casting out moved lines more than once. Another reason would be based on whether the initial cast-in request was speculative, and the results of the underlying operation.

If at decisional block 415, the PU determines not to cast out the selected cache line to a L2.1 cache, the process continues along the NO branch to block 420. As illustrated at block 420, the PU casts out the selected cache line to memory, if required, and the process ends. In one embodiment, if the PU has determined that no eviction is necessary, the PU skips this step.

If at decisional block 415, the PU determines to cast out the selected cache line to an accepting L2.1 cache, the process continues along the YES branch to block 425. Next, as illustrated at block 425, the PU selects an accepting L2.1 PU to receive the selected cache line. In one embodiment, the PU selects the first L2.1 PU to respond to the cast-in request. In an alternate embodiment, the PU selects the closest L2.1 cache to the L2.0 cache. In an alternate embodiment, the PU selects one of the accepting L2.1 caches based on a pre-determined algorithm.

Next, as illustrated at block 430, the PU raises or otherwise sends a commit signal. As described above, in one embodiment, the PU sends a Go commit signal to the selected L2.1 PU. In one embodiment, the PU sends a No Go commit signal to those accepting L2.1 PUs that the PU did not select.

Next, as illustrated at block 435, the selected L2.1 PU assumes ownership of the selected cache line and the requesting L2.0 PU detects or otherwise knows that the L2.1 PU has assumed ownership of the selected cache line. In one embodiment, the L2.0 PU receives an indication from the L2.1 PU that the L2.1 PU has assumed ownership of the selected cache line.

Next, as illustrated at block 440, the L2.0 PU transfers the selected cache line data to the selected L2.1 PU, if required, and the process ends. In one embodiment, the PU transfers the cache line data to a system bus for retrieval by the selected L2.1 PU. In one embodiment, where the selected L2.1 PU has indicated that no data transfer is required, the L2.0 PU skips this step. Thus, the L2.0 PU casts out selected cache lines to neighboring L2.1 caches, which improves the cache performance of the system in which the PU operates. This system also includes a cache miss handling mechanism, described below.

Figure 5:
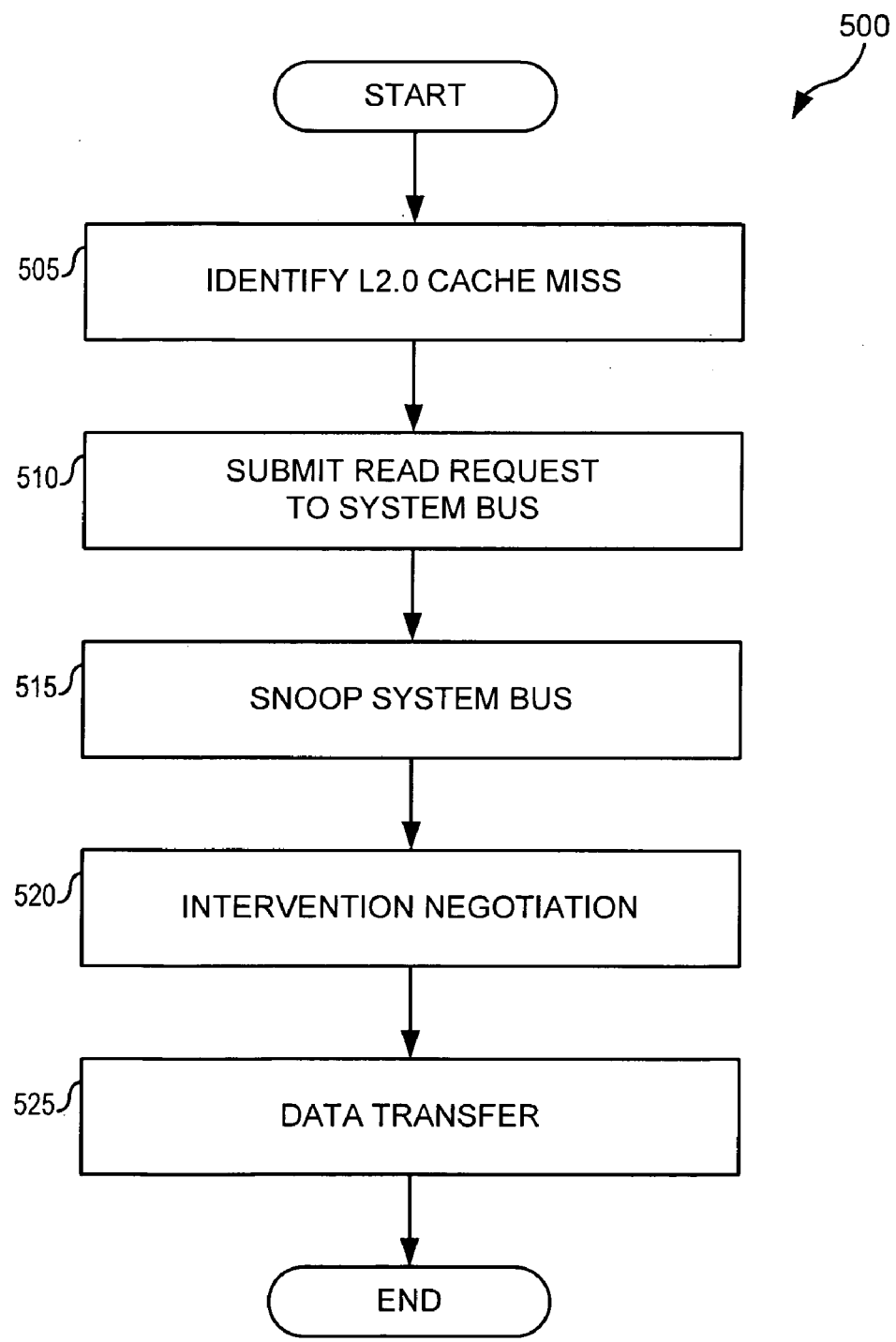
FIG. 5 illustrates a high-level flow diagram depicting logical operational steps of an improved method for optimizing neighboring cache usage in a multiprocessor system, which can be implemented in accordance with a preferred embodiment.

FIG. 5 illustrates one embodiment of a method for optimizing neighboring cache usage in a multiprocessor system. Specifically, FIG. 5 illustrates a high-level flow chart 500 that depicts logical operational steps performed by, for example, system 100 of FIG. 1 implementing coherency protocol 200 of FIG. 2, which may be implemented in accordance with a preferred embodiment. Generally, MCS 120, and in particular neighboring PUs 140, performs the steps of the method, unless indicated otherwise.

As illustrated at block 505, the process begins when a PU identifies an L2.0 cache miss. One skilled in the art will understand that an L2.0 cache miss can occur as the result of, for example, a load instruction. Next, as illustrated at block 510, the PU submits a read request to the system bus, such as secondary bus 132 of FIG. 1, for example, requesting the missed cache line.

Next, as illustrated at block 515, the PU (and the neighboring PUs) snoop the system bus as part of an otherwise conventional bus monitoring transaction. Next, as illustrated at block 520, if one of the neighboring PUs L2 cache contains the requested cache line, the PU and the PU that contains the cache line negotiate an otherwise conventional intervention operation.

Next, as illustrated at block 525, the PU receives the requested cache line from a neighboring PU, in an intervention, or from memory, in an otherwise conventional memory transaction. When the PU has received the requested cache line, the process ends.

Thus, generally, the embodiments described herein provide an interface for a L2.0 PU to cast out a cache line to a neighboring PU's L2.1 cache. As such, the embodiments disclosed herein can improve performance of an L2.0 cache, by advantageously casting out evicted cache lines to a neighboring PU's L2.1 cache. By keeping some of the evicted cache lines in the L2 level of the memory hierarchy, even if associated with a different PU, the evicting PU can later retrieve the cache lines more quickly than if the cache lines had been cast out to memory, or to another lower memory level (such as, for example, an L3 cache).

Accordingly, the disclosed embodiments provide numerous advantages over prior art methods and systems. For example, the disclosed neighboring cache usage protocol takes advantage of an improved cache coherency protocol, which expands the MESI and MESI-T cache coherency protocols, adding three "owned" states. Accordingly, the disclosed neighboring cache usage protocol supports casting out lines from one PU cache into another PU cache, thereby improving cache retention and performance in such a system. In one embodiment, cache lines remain the cache longer, rather than being sent to higher-latency memory.

The disclosed neighboring cache usage protocol also offers particular advantages over specific prior art systems and methods. For example, in contrast to the Former approach, the disclosed neighboring cache usage protocol herein can move a tagged line to a neighboring PU cache in the shared state, with no data traffic required. Additionally, because the Former approach lacks the novel "moved" and "owned" states described herein, Former systems cannot employ such states to prevent endless circulation of old cache lines.

Additionally, in the former system PUs cannot refuse to accept cast out cache lines as cast-in cache lines. In the disclosed neighboring cache usage protocol, a downstream PU can refuse to accept cast out cache lines until the downstream PU has sufficient room in the form of a cache line in a coherency state of invalid, shared, or moved. Thus, unlike the former approach, the present invention does not improve one PU's cache performance at the cost of degrading another PU's cache performance.

The disclosed neighboring cache usage protocol also offers improved flexibility. As described above, L2.1 PUs can refuse a cast-in request. As such, each PU retains control over it's own L2.0 cache, and whether it elects to serve as an L2.1 cache. This aspect of the present invention allows finer-grained controls than prior art solutions in that each L2 cache can be configured to support or reject cast-in requests on a cache-by-cache basis.

Additionally, the disclosed neighboring cache usage protocol also provides an advantage in that, during the request phase, the requesting PU can send cast-in requests only to those neighboring PUs that have a high probability of success. Moreover, in the event insufficient neighboring PUs are likely to accept an incoming cast-in, the requesting PU can bypass the remaining phases and cast out directly to memory, which improves overall latency.

Additionally, the disclosed neighboring cache usage protocol also provides an advantage in that the requesting PU retains the flexibility to abort or otherwise cancel a preciously issued cast-in request. This approach provides the further advantage of generally limiting cast outs to those situations where the cast out is required, and to those neighboring PUs most suitable to receive the cast-in cache line.

The disclosed neighboring cache usage protocol also offers improved latency to memory. In particular, in a preferred embodiment, an L2.0 cache miss causes a read request on the system bus, and therefore to multiple other PUs and the memory controller (and/or lower level cache controller) simultaneously. This improves prior art approaches like the Former approach, which first query L2.1 caches in response to a L2.0 cache miss, and then the memory controller.

The disclosed neighboring cache usage protocol also offers improved scalability over prior art systems, particularly the Former and Garg approaches. In particular, design considerations can determine an optimal or otherwise improved number of L2.0 to L2.1 interfaces for each particular PU, depending on the overall system design. That is, each PU can couple to a different number of downstream neighboring PUs, and that number can be selected based on general optimization principles. Thus, the disclosed neighboring cache usage protocol scales to fit any configuration of multiprocessor environments.

Similarly, the present invention offers numerous advantages over the Garg approach. Because the present invention supports improved cache line cast out and retrieval protocols, such systems are improvements over the Garg approach, and the Garg approach suffers from the disadvantages of a single shared cache. Further, the disclosed neighboring cache usage protocol supports reduced cache miss searching, as line replacement protocols in systems employing the present invention can restrict cache searches to the local L2 cache, instead of multiple L2 caches. As such, the present invention improves cache performance generally, over the Garg approach and other prior art systems and methods.

Moreover, the disclosed neighboring cache usage protocol offers greatly improved scalability, particularly over the Garg approach, which is not scalable. As such, the improved scalability of the embodiments disclosed herein provides a broader applicability than prior art systems and methods.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for allocating data in a data processing system with a system memory and a plurality of processing units (PUs), each PU having a cache comprising a plurality of cache lines, each cache line having one of a plurality of coherency states, and each PU coupled to at least another one of the plurality of PUs, the method comprising:
    selecting, by a first PU, a castout cache line of a plurality of cache lines in a first cache of the first PU to be castout of the first cache;
    sending, by a first downstream link of the first PU, a request to a second PU, wherein the second PU is a neighboring PU of the first PU, the request comprising a first address and first coherency state of the selected castout cache line;
    wherein the first downstream link couples the first PU to the second PU;
    determining, by the second PU, whether the first address matches a second address, the second address corresponding to a cache line in a second cache of the second PU;
    sending, by the second PU, a response to the first PU, based on a coherency state of each of a plurality of cache lines in the second cache and whether the first address matches the second address;
    determining, by the first PU, whether to transmit the castout cache line to the second PU based on the response; and
    in the event the first PU determines to transmit the castout cache line to the second PU, transmitting, by the first PU, the castout cache line to the second PU.

2. The method of claim 1, further comprising:
    in the event the first PU determines not to transmit the castout cache line to the second PU, determining, by the first PU whether to transmit the castout cache line to memory; and
    in the event the first PU determines to transmit the castout cache line to memory, transmitting the castout cache line to memory.

3. The method of claim 1, further comprising:
    determining, by the first PU, the status of a hint line;
    the hint line indicating a receptivity of the second PU, wherein each PU of the plurality of PUs further comprises a distinct associated hint line; and
    wherein the first PU sends the request to the second PU based on the status of the hint line.

4. The method of claim 1, further comprising sending, by the first PU, a request to a plurality of PUs, wherein each of the plurality of PUs is a neighboring PU, the request comprising a first address and first coherency state of the selected castout cache line.

5. The method of claim 1, wherein the response to the first PU comprises one of a list of responses including YES, NO, and RETRY.

6. The method of claim 1, wherein the response to the first PU comprises a route tag indicating the cache line second address.

7. The method of claim 6, further comprising, in the event the first PU determines to transmit the castout cache line to the second PU, transmitting, by the first PU, the castout cache line and the route tag to the second PU.

8. The method of claim 1, further comprising, in the event the first PU determines to transmit the castout cache line to the second PU, transmitting, by the first PU, a commit signal to the second PU.

9. The method of claim 1, wherein the response to the first PU comprises an indication of whether the second cache contains data matching data of the castout cache line.

10. A processor comprising a computer program product for managing data in a data processing system with a system memory and a plurality of processing units (PUs), each PU having a cache comprising a plurality of cache lines, each cache line having one of a plurality of coherency states, and each PU coupled to at least another one of the plurality of PUs, computer program product having a tangible computer-readable medium with a computer program embodied thereon, the computer program comprising:
    computer code for selecting, by a first PU, a castout cache line of a plurality of cache lines in a first cache of the first PU to be castout of the first cache;
    computer code for sending, by a first downstream link of the first PU, a request to a second PU, wherein the second PU is a neighboring PU of the first PU, the request comprising a first address and first coherency state of the selected castout cache line;
    wherein the first downstream link couples the first PU to the second PU;
    computer code for determining, by the second PU, whether the first address matches a second address, the second address corresponding to an address of one of a plurality of cache lines in the second PU;
    computer code for sending, by the second PU, a response to the first PU, based on a coherency state of each of a plurality of cache lines in the second cache and whether there is an address hit;

computer code for determining, by the first PU, whether to transmit the castout cache line to the second PU based on the response; and computer code for, in the event the first PU determines to transmit the castout cache line to the second PU, transmitting, by the first PU, the castout cache line to the second PU.

11. The processor of claim 10, further comprising:

computer code for, in the event the first PU determines not to transmit the castout cache line to the second PU, determining, by the first PU whether to transmit the castout cache line to memory; and computer code for, in the event the first PU determines to transmit the castout cache line to memory, transmitting the castout cache line to memory.

12. The processor of claim 10, further comprising:

computer code for determining, by the first PU, the status of a hint line;

the hint line indicating a receptivity of the second PU, wherein each PU of the plurality of PUs further comprises a distinct associated hint line; and computer code for sending the request to the second PU based on the status of the hint line.

13. The processor of claim 10, wherein the response to the first PU comprises a route tag indicating the cache line second address.

14. The processor of claim 10, further comprising computer code for, in the event the first PU determines to transmit the castout cache line to the second PU, transmitting, by the first PU, a commit signal to the second PU.

15. The processor of claim 10, wherein the response to the first PU comprises an indication of whether the second cache contains data that matches data of the castout cache line.

16. A system, comprising:

a system memory;

a plurality of processing units (PUs) coupled to the system memory, each PU further coupled to a common system bus and to at least one other of the plurality of PUs through an associated dedicated link;

wherein each PU comprises a cache;

wherein a first PU is configured to:

select a castout cache line of a plurality of cache lines in a first cache of the first PU to be castout of the first cache; and send, by an associated dedicated link between the first PU and the second PU, a request to a second PU, wherein the second PU is a neighboring PU of the first PU, the request comprising a first address and first coherency state of the selected castout cache line;

wherein the second PU is configured to:

determine whether the first address matches a second address, the second address corresponding to a cache line in a second cache of the second PU; and send a response to the first PU, based on a coherency state of each of a plurality of cache lines in the second cache and whether the first address matches the second address;

wherein the first PU is further configured to:

determine whether to transmit the castout cache line to the second PU based on the response; and transmit the castout cache line to the second PU, in the event the first PU determines to transmit the castout cache line to the second PU.

17. The system of claim 16, further comprising a hint line coupled to the first PU and to the second PU, wherein the hint line is configured to indicate a receptivity state of the second PU.

18. The system of claim 16, wherein the response to the first PU comprises an indication of whether the second cache contains data that matches data of the castout cache line.

19. The system of claim 16, wherein the response to the first PU comprises a route tag indicating a cache line second address.

20. The system of claim 16, wherein the associated dedicated link between the first PU and the second PU further comprises:

a request line coupled to the first PU and the second PU configured to transmit the request form the first PU to the second PU;

a response line coupled to the first PU and the second PU and configured to transmit the response from the second PU to the first PU; and a commit line coupled to the first PU and the second PU and configured to indicate whether the first PU has determined to transmit the castout cache line to the second PU.

* * * * *